United States Patent
Dogomori

(10) Patent No.: US 11,466,160 B2
(45) Date of Patent: Oct. 11, 2022

(54) METHOD FOR PRODUCING SURFACE-TREATED CARBON BLACK, METHOD FOR PRODUCING RUBBER WET MASTERBATCH, AND METHOD FOR PRODUCING RUBBER COMPOSITION

(71) Applicant: Toyo Tire Corporation, Itami (JP)

(72) Inventor: Kento Dogomori, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 358 days.

(21) Appl. No.: 16/529,181

(22) Filed: Aug. 1, 2019

(65) Prior Publication Data

US 2020/0048471 A1 Feb. 13, 2020

(30) Foreign Application Priority Data

Aug. 10, 2018 (JP) .............................. JP2018-150938
Aug. 10, 2018 (JP) .............................. JP2018-150939

(51) Int. Cl.
*C09C 1/56* (2006.01)
*C08K 9/04* (2006.01)
*C08L 7/02* (2006.01)
*C08J 3/22* (2006.01)
*C08K 3/04* (2006.01)

(52) U.S. Cl.
CPC .................. *C09C 1/56* (2013.01); *C08J 3/226* (2013.01); *C08K 3/04* (2013.01); *C08K 9/04* (2013.01); *C08L 7/02* (2013.01); *C08L 2310/00* (2013.01)

(58) Field of Classification Search
CPC ... C09C 1/56; C08J 3/226; C08K 3/04; C08K 9/04; C08L 7/02; C08L 2310/00
See application file for complete search history.

(56) References Cited

U.S. PATENT DOCUMENTS 6,048,923 A * 4/2000 Mabry ....................... C08C 1/15
524/496
2013/0289165 A1 10/2013 De Landtsheer et al.
2015/0018449 A1 1/2015 Hasegawa

FOREIGN PATENT DOCUMENTS

| JP | 2010-270200 A | 12/2010 |
| JP | 2014-501827 A | 1/2014 |
| JP | 2015-17209 A | 1/2015 |
| JP | 2017-95663 A | 6/2017 |

OTHER PUBLICATIONS

Office Action dated May 20, 2022, issued in counterpart JP application No. 2018-150939, with English translation. (8 pages).

* cited by examiner

*Primary Examiner* — Edward J Cain
(74) *Attorney, Agent, or Firm* — WHDA, LLP

(57) ABSTRACT

Disclosed is a method for producing a surface-treated carbon black, including a step (step (i)) of mixing a carbon-black-containing aqueous-slurry-solution in which a carbon black is dispersed in water with a dihydrazide compound, and subsequently removing the water. Disclosed is a method for producing a rubber wet masterbatch, including: a step (I) of mixing a carbon-black-containing aqueous-slurry-solution in which a carbon black is dispersed in water, a rubber latex solution, and a dihydrazide compound with each other to produce a carbon-black-containing aqueous-rubber-latex-solution; a step (II) of solidifying the resultant carbon-black-containing aqueous-rubber-latex-solution to produce a carbon-black-containing rubber solidified product; and a step (III) of dehydrating and drying the resultant carbon-black-containing rubber solidified product to produce the rubber wet masterbatch. These producing methods can give a vulcanized rubber low in exothermicity, and a rubber composition restrained from being lowered in scorch property (or having scorch resistance).

5 Claims, No Drawings

METHOD FOR PRODUCING SURFACE-TREATED CARBON BLACK, METHOD FOR PRODUCING RUBBER WET MASTERBATCH, AND METHOD FOR PRODUCING RUBBER COMPOSITION

BACKGROUND OF THE INVENTION

Field of the Invention

The present invention relates to a method for producing a surface-treated carbon black, a method for producing a rubber wet masterbatch, and a method for producing a rubber composition.

Description of the Related Art

In order to improve a low-fuel-consumption property, a low exothermicity and other properties of a pneumatic tire obtained using a rubber composition as raw material, it is known in the prior art (Patent Documents 1 and 2) to use a dihydrazide compound in the rubber composition.

PRIOR ART DOCUMENT

Patent Documents

Patent Document 1: JP-A-2017-95663
Patent Document 2: JP-A-2014-501827

SUMMARY OF THE INVENTION

Apart from the above, in the market, as rubber compositions, compositions better in scorch property (workability) are desired. Furthermore, as tires (vulcanized rubbers) obtained using any one of the compositions as raw material, tires better in low exothermicity are desired. However, about vulcanized rubbers yielded, respectively, from rubber compositions as described in the above-mentioned patent documents, there remains room for improving these properties.

In the light of the above-mentioned situation, the present invention has been made. A first object thereof is to provide a method for producing a surface-treated carbon black, that can give a vulcanized rubber having a low exothermicity and give a rubber composition which can be restrained from being lowered in scorch property (which has scorch resistance).

In the light of the above-mentioned situation, the present invention has been made also. A second object thereof is to provide a method for producing a rubber wet masterbatch, that can give a vulcanized rubber having a low exothermicity and give a rubber composition which can be restrained from being lowered in scorch property (which has a scorch resistance).

The present invention relates to a method for producing a surface-treated carbon black, including a step (step (i)) of mixing a carbon-black-containing aqueous-slurry-solution in which a carbon black is dispersed in water with a dihydrazide compound, and subsequently removing the water.

The present invention also relates to a method (1) for producing a rubber composition, including a step (step (ii)) of kneading a rubber with a surface-treated carbon black yielded by the above-mentioned method for producing a surface-treated-carbon-black.

The present invention also relates to a method for producing a rubber wet masterbatch, including: a step (I) of mixing a carbon-black-containing aqueous-slurry-solution in which a carbon black is dispersed in water, a rubber latex solution, and a dihydrazide compound with each other to produce a carbon-black-containing aqueous-rubber-latex-solution; a step (II) of solidifying the resultant carbon-black-containing aqueous-rubber-latex-solution to produce a carbon-black-containing rubber solidified product; and a step (III) of dehydrating and drying the resultant carbon-black-containing rubber solidified product to produce the rubber wet masterbatch.

The present invention also relates to a method (2) for producing a rubber composition, including a step (IV) of using a rubber wet masterbatch yielded by the above-mentioned rubber-wet-masterbatch producing method to attain dry-mixing.

About an action mechanism of advantageous effects of the respective methods for producing a surface-treated carbon black, a rubber wet masterbatch, and a rubber composition according to the present invention, details thereof are partially unclear. However, the mechanism is presumed as described below. However, the invention may not be interpreted with limitation to this action mechanism.

The method for producing a surface-treated carbon black of the present invention includes a step (step (i)) of mixing a carbon-black-containing aqueous-slurry-solution in which a carbon black is dispersed in water with a dihydrazide compound, and subsequently removing the water. The method for producing a rubber wet masterbatch of the present invention includes a step (I) of mixing a carbon-black-containing aqueous-slurry-solution in which a carbon black is dispersed in water, a rubber latex solution, and a dihydrazide compound with each other to produce a carbon-black-containing aqueous-rubber-latex-solution. It is presumed that the mixing of the carbon-black-containing aqueous-slurry-solution with the dihydrazide compound makes it possible that the dihydrazide compound adheres (bonds) effectively onto the carbon black surface (functional groups (for example, carboxyl groups) present on the surface, the number of these groups being small). When the above-mentioned mixing is attained, in particular, at the predetermined temperature or higher, the dihydrazide compound can be sufficiently dissolved in the slurry-solution. It is therefore presumed that between the carbon black and the dihydrazide compound, contact efficiency can be raised so that the dihydrazide compound can further efficiently adhere (bond) to the carbon black to produce a carbon-black-containing slurry in which the dihydrazide compound adheres (bonds) to the carbon black. The removal of the water from the resultant carbon-black-containing slurry, in which the dihydrazide compound adheres (bond) to the carbon black, makes it possible to produce a surface-treated carbon black. Alternatively, the resultant carbon-black-containing slurry, in which the dihydrazide compound adheres (bond) to the carbon black, is usable as a raw material of a rubber wet masterbatch in the same manner as in the prior art.

It is presumed that the use of this surface-treated carbon black or the rubber wet masterbatch, as a raw material for a rubber composition, allows carbon-carbon double bond moieties of the dihydrazide compound present in the carbon black surface to be bonded to the rubber component (polymer) by reaction of the moieties with radicals of the rubber component (polymer) or reaction which follows sulfur-crosslinkage of the rubber component. Consequently, the resultant vulcanized rubber is excellent in low exothermicity.

It is presumed that the use of this surface-treated carbon black or the rubber wet masterbatch, as a raw material for a rubber composition, does not cause an unreacted fraction of the dihydrazide compound to promote any vulcanization reaction. Consequently, the rubber composition can be restrained from being lowered in scorch property.

DETAILED DESCRIPTION OF THE PREFERRED EMBODIMENTS

<Method for Producing Surface-Treated Carbon Black>

The method for producing a surface-treated carbon black of the present invention includes a step (step (i)) of mixing a carbon-black-containing aqueous-slurry-solution in which a carbon black is dispersed in water with a dihydrazide compound, and subsequently removing the water.

<Method for Producing Rubber Wet Masterbatch>

The method for producing a rubber wet masterbatch the present invention includes a step (I) of mixing a carbon-black-containing aqueous-slurry-solution in which a carbon black is dispersed in water, a rubber latex solution, and a dihydrazide compound with each other to produce a carbon-black-containing aqueous-rubber-latex-solution, a step (II) of solidifying the resultant carbon-black-containing aqueous-rubber-latex-solution to produce a carbon-black-containing rubber solidified product, and a step (III) of dehydrating and drying the resultant carbon-black-containing rubber solidified product to produce the rubber wet masterbatch.

The carbon black is any carbon black species used in an ordinary rubbery industry, such as SAF, ISAF, HAF, FEF, or GFP. The carbon black may also be an electroconductive carbon black such as acetylene black or Kitchen black. The carbon black may be any granulated carbon black, which has been granulated, considering the handleability of the carbon black in an ordinary rubbery industry; or a non-granulated carbon black. Such carbon blacks may be used singly or in any combination of two or more thereof.

About the carbon black, from the viewpoint of an improvement thereof in vulcanized-rubber-reinforcing performance, the DBP absorption (dibutyl phthalate absorption) thereof is preferably 80 $cm^3$/100-g or more, more preferably 110 $cm^3$/100-g or more, and is preferably 180 $cm^3$/100-g or less, more preferably 140 $cm^3$/100-g or less.

About the carbon black, from the viewpoint of an improvement of the vulcanized rubber in low exothermicity, the nitrogen adsorption specific surface area is preferably 30 $m^2$/g or more, more preferably 50 $m^2$/g or more, even more preferably 100 $m^2$/g or more, and is preferably 250 $m^2$/g or less, more preferably 200 $m^2$/g or less, even more preferably 180 $m^2$/g or less.

The above-mentioned medium water is a medium made of a water species, as a main component, examples of the species including ion exchange water, distilled water and industrial water. The medium may be, for example, water containing an organic solvent.

The carbon-black-containing aqueous-slurry-solution is usually yielded by mixing the carbon black and water described just above with each other. The method for the mixing may be a method of dispersing the carbon black thereinto, using an ordinary dispersing machine such as a highly shearing mixer, a High Shear Mixer, a homo-mixer, a ball mill, a bead mill, a high-pressure homogenizer, an ultrasonic homogenizer or a colloid mill. At the time of the mixing, the whole of the mixing system, for example, the dispersing machine may be optionally heated. The carbon-black-containing aqueous-slurry-solution may be prepared by adding the dihydrazide compound, which will be detailed later, into the water.

The proportion of the carbon black in the carbon-black-containing aqueous-slurry-solution is preferably from 1 to 20% by weight. The proportion of the carbon black in the carbon-black-containing slurry-aqueous-solution is more preferably 2% or more, even more preferably 5% or more by weight to heighten the efficiency of a work for the water-removing step. The proportion of the carbon black in the carbon-black-containing slurry solution is more preferably 15% or less, even more preferably 12% or less by weight to lower the carbon-black-containing aqueous-slurry-solution in viscosity to heighten the efficiency of stirring the aqueous-slurry-solution.

As the rubber latex solution, a natural rubber latex solution and a synthetic rubber latex solution are usable.

The natural rubber latex solution is a natural product based on a metabolic effect of plants, and is preferably a natural-rubber/water based latex solution in which a dispersing solvent is, particularly, water. The number-average molecular weight of the natural rubber in the natural rubber latex is preferably 2000000 or more, more preferably 2500000 or more. About the natural rubber latex solution, concentrated latex, fresh latex called field latex, and other latexes can be used without being distinguished from each other. The synthetic rubber latex solution is, for example, a latex solution in which a rubber is produced by emulsion polymerization, examples of this rubber including styrene-butadiene rubber, butadiene rubber, nitrile rubber, and chloroprene rubber. Such rubber latex solutions may be used singly or in any combination of two or more thereof.

The dihydrazide compound is a compound having, in the molecule thereof, two hydrazide groups (—$CONHNH_2$). Examples thereof include dihydrazide isophthalate, dihydrazide terephthalate, dihydrazide azelate, dihydrazide adipate, dihydrazide succinate, dihydrazide eicosadioate, and 7,11-octadecadiene-1,18-dicarbohydrazide. Out of these compounds, the dihydrazide compound is preferably dihydrazide isophthalate or dihydrazide adipate, more preferably dihydrazide isophthalate. Such dihydrazide compounds may be used singly or in any combination of two or more thereof.

The method for mixing the carbon-black-containing slurry-aqueous-solution with the dihydrazide compound is, for example, a method of using an ordinary dispersing machine, such as a highly shearing mixer, a High Shear Mixer, a homo-mixer, a ball mill, a bead mill, a high-pressure homogenizer, an ultrasonic homogenizer or a colloid mill, or a method of using an agitating machine such as a stirrer or shaker.

The method for mixing the carbon-black-containing slurry-aqueous-solution, the rubber latex solution, and the dihydrazide compound with each other is, for example, a method of using the above-mentioned ordinary dispersing machine, such as a highly shearing mixer, a High Shear Mixer, a homo-mixer, a ball mill, a bead mill, a high-pressure homogenizer, an ultrasonic homogenizer or a colloid mill, or using a mixing machine in which a blade is rotated in a cylindrical vessel. About the mixing, the individual components may be added to each other in any order to be mixed with each other, or all the components may be mixed simultaneously with each other.

From the viewpoint of an improvement of the vulcanized rubber in low exothermicity, the amount of dihydrazide compound to be used is preferably 0.02 parts or more, more preferably 0.05 parts or more, even more preferably 0.1 parts or more, even more preferably 0.2 parts or more by weight for 100 parts by weight of the carbon black. From the viewpoint of a restraint (prevention) of the rubber composition from being lowered (deteriorated) in scorch property, the amount is preferably 20 parts or less, more preferably 10 parts or less, even more preferably 5 parts or less, even more preferably 3 parts or less by weight.

It is preferred to mix, at 60° C. or higher, the carbon-black-containing aqueous-slurry-solution and the dihydrazide compound with each other, or the carbon-black-containing aqueous-slurry-solution, the rubber latex solution, and the dihydrazide compound with each other. The carbon-black-containing aqueous-slurry-solution and the dihydrazide compound are mixed with each other, or the carbon-black-containing aqueous-slurry-solution, the rubber latex solution, and the dihydrazide compound are mixed with each other more preferably at 70° C. or higher, even more preferably at 80° C. or higher to dissolve the dihydrazide compound sufficiently into the carbon-black-containing aqueous-slurry-solution to heighten contact efficiency between the carbon black and the dihydrazide compound, and preferably at the boiling point of the water, or lower from the viewpoint of safety. The treating period for the above-mentioned mixing is not mentioned without reservation since the period depends on, for example, the amount of used carbon black. The period is usually from about 3.0 to 5.0 minutes.

The method for removing the water is never limited as far as the method is a method capable of yielding the surface-treated carbon black (powder of the surface-treated carbon black) in the step (i). Usually, the method for removing the water is preferably a dehydrating method based on, for example, filtration treatment from the viewpoint of the water-removing efficiency. In order to remove the water further from the surface-treated carbon black yielded by, for example, the filtration treatment, this carbon black is preferably subjected to drying treatment. The drying treatment is not particularly limited. Examples thereof include hot-wind drying, reduced-pressure drying, freeze-drying, and spray drying.

<Step (I)>

The step (I) in the present invention includes an operation of mixing a carbon-black-containing aqueous-slurry-solution in which a carbon black is dispersed in water, a rubber latex solution, and a dihydrazide compound with each other to produce a carbon-black-containing aqueous-rubber-latex-solution. In the present invention, the step (I) may include a step (I-1) of adding, at the time of dispersing the carbon black into the medium water, at least one portion of the rubber latex solution into the present dispersing system to produce a carbon-black-containing aqueous-slurry-solution in which rubber latex particles adhere to the carbon black; and a step (I-2) of mixing the resultant carbon-black-containing aqueous-slurry-solution, in which the rubber latex particles adhere to the carbon black, with the rest of the rubber latex solution to produce a carbon-black-containing aqueous-rubber-latex-solution in which the rubber latex particles adhere onto the carbon black.

<Step (II)>

The step (II) in the present invention includes an operation of solidifying the carbon-black-containing aqueous-rubber-latex-solution yielded through the above-mentioned step to produce a carbon-black-containing rubber solidified product.

The method for the solidifying may be a method of incorporating a solidifier into the carbon-black-containing aqueous-rubber-latex-solution. Usable examples of the solidifier include acids such as formic acid and sulfuric acid, and salts such as sodium chloride, these acids or salts being ones usually used to solidify a rubber latex solution.

<Step (III)>

The step (III) in the present invention includes an operation of dehydrating and drying the carbon-black-containing rubber solidified product to produce a rubber wet masterbatch. The method for the dehydrating/drying may be a method using a dehydrating/drying machine that may be of various types, such as a uniaxial extruder, a biaxial extruder, an oven, a conveyer-type drier, a vacuum drier, or an air drier. The present rubber-wet-masterbatch-producing method may include, before the step (III), a centrifugal separation step, or a solid/liquid-separating step using a vibrating screen in order to decrease appropriately the water amount contained in the carbon-black-containing rubber solidified product. Alternatively, the method may include a washing step, such as a water washing method, to wash the solidified product.

<Method (1) for Producing Rubber Composition>

The method (1) for producing a rubber composition of the present invention includes a step (step (ii)) of kneading a rubber and a surface-treated carbon black yielded by the above-defined method for producing a surface-treated-carbon-black.

<Method (2) for Producing Rubber Composition>

The method (2) for producing a rubber composition of the present invention includes a step (IV) of using a rubber wet masterbatch yielded through the above-mentioned steps to attain dry-mixing.

Raw materials of the rubber composition are a rubber and various blending agents that are usually used in the rubbery industry.

Examples of the rubbers include natural rubber (NR); and synthetic diene rubbers such as isoprene rubber (IR), styrene-butadiene rubber (SBR), butadiene rubber (BR), chloroprene rubber (CR), and nitrile rubber (NBR). Such rubbers may be used singly or in any combination of two or more thereof.

The amount of dihydrazide compound is preferably 0.01 parts or more, more preferably 0.03 parts or more, even more preferably 0.05 parts or more, even more preferably 0.1 parts or more by weight for 100 parts by weight of the rubber component(s) in the rubber composition from the viewpoint of an improvement of the resultant vulcanized rubber in low exothermicity. The amount is preferably 10 parts or less, more preferably 5 parts or less, even more preferably 3 parts or less, even more preferably 1.5 parts or less by weight from the viewpoint of a restraint (prevention) of a lowering (deterioration) of the rubber composition in scorch property.

The surface-treated carbon black is preferably from 30 to 100 parts by weight, more preferably from 35 to 80 parts by weight, even more preferably from 40 to 70 parts by weight for 100 parts by weight of the rubber component(s) in the rubber composition from the viewpoint of an improvement of the vulcanized rubber in reinforceability.

The amount of carbon black is preferably from 30 to 100 parts, more preferably from 35 to 80 parts, even more preferably from 40 to 70 parts by weight for 100 parts by weight of the rubber component(s) in the rubber composition from the viewpoint of an improvement of the vulcanized rubber in reinforceability.

Examples of the various blending agents include sulfur-based vulcanizers, vulcanization promoters, antiaging agents, silica, silane coupling agents, zinc oxide, methylene receptors and methylene donors, stearic acid, vulcanization promotion aids, vulcanization retarders, organic peroxides, softeners such as wax and oil, and processing aids.

The species of sulfur for the sulfur-based vulcanizers may be any ordinary sulfur species for rubbers. Examples of the species include powdery sulfur, precipitated sulfur, insoluble sulfur, and highly dispersed sulfur. The sulfur-based vulcanizers may be used singly or in any combination of two or more thereof.

The content of the sulfur species is preferably from 0.3 to 6.5 parts by weight for 100 parts by weight of the rubber component(s) in the rubber composition. If the content of the sulfur species is less than 0.3 parts by weight, the vulcanized rubber is short in crosslinkage density to be lowered in rubber strength and others. If the content is more than 6.5 parts by weight, the vulcanized rubber is deteriorated, in particular, in both of heat resistance and endurance. The content of the sulfur species is more preferably from 1.0 to 5.5 parts by weight for 100 parts by weight of the rubber component(s) in the rubber composition to cause the vulcanized rubber to keep a good rubber strength and have further improved heat resistance and endurance.

The vulcanization promoters may each be any ordinary vulcanization promoter for rubbers. Examples thereof include sulfenamide based, thiuram based, thiazole based, thiourea based, guanidine based and dithiocarbamic acid salt based vulcanization promoters. The vulcanization promoters may be used singly or in any combination of two or more thereof.

The content of the vulcanization promoter(s) is preferably from 1 to 5 parts by weight for 100 parts by weight of the rubber component(s) in the rubber composition.

The antiaging agents may each be any ordinary antiaging agent for rubbers. Examples thereof include aromatic amine based, amine-ketone based, monophenol based, bisphenol based, polyphenol based, dithiocarbamic acid salt based, and thiourea based antiaging agents. The antiaging agents may be used singly or in any combination of two or more thereof.

The content of the antiaging agent(s) is preferably from 1 to 5 parts by weight for 100 parts by weight of the rubber component(s) in the rubber composition.

The method for blending (or adding) the surface-treated carbon black, the rubber, and the various blending agents into each other, or the method for blending (or adding) the rubber wet masterbatch and the various blending agents into each other is, for example, a method of kneading these components using a kneading machine used in an ordinary rubber industry, such as a Banbury mixer, a kneader, or a roll.

The kneading method is not particularly limited, and is, for example, a method of adding components other than vulcanization-related components, such any sulfur based vulcanizer and any vulcanization promoter, to each other in any order or adding these components to each other simultaneously, so as to knead these components, or a method of adding all the components to each other simultaneously to knead the components. The number of times of the kneading may be one or plural. The period for the kneading is varied in accordance with the size of a kneading machine used for the kneading, and some other factor. It is advisable to set the period usually into the range of about 2 to 5 minutes. The discharging-temperature of the rubber composition in the kneading machine is set to a range preferably from 120 to 170° C., more preferably from 120 to 150° C. When the rubber composition includes one or more of the vulcanization related components, the discharging-temperature in the kneading machine is set to a range preferably from 80 to 110° C., more preferably from 80 to 100° C.

A surface-treated-carbon-black-containing rubber composition or a rubber-wet-masterbatch-containing rubber composition according to the present invention has scorch resistance. A vulcanized rubber yielded from the rubber composition is low in exothermicity to be suitable for pneumatic tires.

EXAMPLES

Hereinafter, the present invention will be described by way of working examples thereof. However, the invention is never limited by these working examples.
(Used Raw Materials)
  a) Dihydrazide compound: dihydrazide isophthalate (manufactured by Japan Finechem Inc.);
  b) Carbon black: "SEAST 6 (ISAF)" (manufactured by Tokai Carbon Co., Ltd.; nitrogen adsorption specific surface area: 119 m$^2$/g, and DBP absorption: 114 cm$^3$/100-g);
  c) Natural rubber latex solution: "NR field latex" (manufactured by a company Golden Hope) (DRC=31.2%);
  d) Natural rubber: "RSS #3";
  e) Zinc oxide: "Zinc Oxide, species 2" (manufactured by Mitsui Mining & Smelting Co., Ltd.);
  f) Stearic acid: "BEADS STEARIC ACID" (manufactured by NOF Corp.);
  g) Antiaging agent: N-(1,3-dimethylbutyl)-N'-phenyl-p-phenylenediamine "ANTIGEN 6C" (manufactured by Sumitomo Chemical Co., Ltd.);
  h) Sulfur: "5%-OIL-INCORPORATED FINELY-POWDERY SULFUR" (manufactured by Tsurumi Chemical Industry Co., Ltd.);
  i) Vulcanization promoter (A): N-cyclohexyl-2-benzothiazole sulfenamide: "SUNCELLER CM-G" (manufactured by Sanshin Chemical Industry Co., Ltd.); and
  j) Vulcanization promoter (B): N-tert-butyl-2-benzothiazolylsulfenamide: "NOCCELLAR NS-P" (manufactured by Ouchi Shinko Chemical Industrial Co., Ltd.).

Example 1

<Step (i): Production of Surface-Treated Carbon Black>

To 3600 g of water was added 400 g of a carbon black ("SEAST 6" (ISAF), manufactured by Tokai Carbon Co., Ltd. The temperature of the resultant was raised to 70° C. while a product Robomix manufactured by Primix Corp. was used to disperse the carbon black into the water. Furthermore, thereto was added 0.4 g of dihydrazide isophthalate as a dihydrazide compound to set the ratio by weight of the carbon black/the dihydrazide compound to a ratio by weight shown in Table 1. These components were stirred to prepare a slurry mixture (conditions of the Robomix, manufactured by Primix Corp.: a rotation number of 9,000 rpm, a treating period of 30 minutes, and a treating temperature of 70° C.). Next, a filtrating paper sheet was used to subject the resultant slurry mixture to filtrating treatment to dehydrate the mixture. The resultant residue was then vacuum-dried (at 70° C.) overnight to produce a surface-treated carbon black 1. The blend proportion of each of any carbon black and any dihydrazide compound in Table 1 is represented by the numerical value (phr) of the part(s) by weight of the carbon black or the compound when the whole amount of rubber component contained in the corresponding rubber composition shown in Table 2 is regarded as 100 parts by weight.

<Step (ii): Production of Rubber Composition and Unvulcanized Rubber Composition>

A Banbury mixer was used to dry-mix the surface-treated carbon black 1 yielded as described above with individual materials (i.e., components other than sulfur and any vulcanization promoter) shown in Table 2 (kneading period: 3 minutes; composition-discharging temperature: 150° C.). In this way, a rubber composition was produced. Next, to the resultant rubber composition were added sulfur, a vulcanization promoter (A) and a vulcanization promoter (B) that are shown in Table 2, and then the Banbury mixer was used to dry-mix all the components (kneading period: 1 minute; component-discharging-temperature: 90° C.). In this way, an unvulcanized rubber composition was produced. The blend proportion of any component in Table 2 is represented by the numerical value (phr) of the part(s) by weight of this component when the whole amount of the rubber component contained in the corresponding rubber composition is regarded as 100 parts by weight. The numerical value of the part(s) by weight of any surface-treated carbon black in Table 2 represents the numerical value of only the total weight of the carbon black and the dihydrazide compound.

Examples 2 to 4

<Step (i): Production of Surface-Treated Carbon Black>
Surface-treated carbon blacks 2 to 4 were each produced by the same operations as in Example 1 except that the ratio by weight of the carbon black/the dihydrazide compound was changed as shown in Table 1.
<Step (ii): Production of Rubber Composition and Unvulcanized Rubber Composition>
In each of the examples, a rubber composition and an unvulcanized rubber composition were produced in the same way as in Example 1 except that the species of the surface-treated carbon black and the blend amount thereof were changed as shown in Table 2.

Comparative Examples 1 and 2

In each of the examples, a Banbury mixer was used to dry-mix individual raw materials (i.e., components other than any sulfur and any vulcanization promoter) shown in Table 2 (kneading period: 3 minutes; composition-discharging-temperature: 150° C.). In this way, a rubber composition was produced. Next, to the resultant rubber composition were added sulfur, a vulcanization promoter (A) and a vulcanization promoter (B) that are shown in Table 2, and then the Banbury mixer was used to dry-mix these components (kneading period: 1 minute; composition-discharging-temperature: 90° C.). In this way, an unvulcanized rubber composition was produced.

The unvulcanized rubber composition yielded in each of the working examples and the comparative examples was evaluated as described below. The evaluation results are shown in Table 2.

<Scorch Resistance Evaluation>
About the evaluation of the scorch resistance of each of the examples, in accordance with JIS K6300, a rotor-less Mooney meter manufactured by Toyo Seiki Seisaku-Sho Ltd. was used to pre-heat the unvulcanized rubber composition at 125° C. for 1 minute, and then measure a period t5 required to raise the temperature of the composition, by 5 Mooney units, from the lowest viscosity Vm of the composition. The resultant value was represented by an index relative to the value regarded as 100 in Comparative Example 1. It is demonstrated that as the index of the compositions is larger, the scorch time thereof is longer so that the compositions are better in scorch resistance.

The unvulcanized rubber composition yielded in each of the working examples and the comparative examples was vulcanized at 150° C. for 30 minutes to produce a vulcanized rubber. The resultant vulcanized rubber was evaluated as described below. The evaluation results are shown in Table 2.

<Exothermicity Evaluation>
About the evaluation of the exothermicity of each of the examples, a viscoelasticity tester manufactured by Toyo Seiki Seisaku-Sho Ltd. was used to measure the loss coefficient tan δ under conditions of a static strain of 10%, a dynamic strain of ±2%, a frequency of 50 Hz, and a temperature of 60° C. The value in each of the examples other than Comparative Example 1 was represented by an index relative to the value regarded as 100 in Comparative Example 1. It is demonstrated that as the index of the vulcanized rubbers is smaller, the vulcanized rubbers less easily generate heat so that the vulcanized rubbers are better in low exothermicity.

TABLE 1

|  | Surface-treated carbon black 1 | Surface-treated carbon black 2 | Surface-treated carbon black 3 | Surface-treated carbon black 4 |
| --- | --- | --- | --- | --- |
| Carbon black | 50 | 50 | 50 | 50 |
| Water | 450 | 450 | 450 | 450 |
| Dihydrazide compound | 0.05 | 0.5 | 2 | 5 |

TABLE 2

|  | Comparative Example 1 | Comparative Example 2 | Example 1 | Example 2 | Example 3 | Example 4 |
| --- | --- | --- | --- | --- | --- | --- |
| Natural rubber | 100 | 100 | 100 | 100 | 100 | 100 |
| Carbon black | 50 | 50 |  |  |  |  |
| Surface-treated carbon black 1 |  |  | 50.05 |  |  |  |
| Surface-treated carbon black 2 |  |  |  | 50.5 |  |  |
| Surface-treated carbon black 3 |  |  |  |  | 52 |  |
| Surface-treated carbon black 4 |  |  |  |  |  | 55 |
| Dihydrazide compound |  | 0.5 |  |  |  |  |
| Zinc oxide | 3 | 3 | 3 | 3 | 3 | 3 |
| Stearic acid | 2 | 2 | 2 | 2 | 2 | 2 |
| Antiaging agent | 1 | 1 | 1 | 1 | 1 | 1 |
| Sulfur | 2 | 2 | 2 | 2 | 2 | 2 |
| Vulcanization promoter (A) | 1.5 | 1.5 | 1.5 | 1.5 | 1.5 | 1.5 |

TABLE 2-continued

|  | Comparative Example 1 | Comparative Example 2 | Example 1 | Example 2 | Example 3 | Example 4 |
|---|---|---|---|---|---|---|
| Vulcanization promoter (B) | 0.5 | 0.5 | 0.5 | 0.5 | 0.5 | 0.5 |
| Exothermicity | 100 | 84 | 79 | 70 | 69 | 68 |
| Scorch resistance | 100 | 80 | 96 | 93 | 88 | 82 |

Example 5

<Step (I): Production of Carbon-Black-Containing Aqueous-Rubber-Latex-Solution>

To 3600 g of water was added 400 g of a carbon black ("SEAST 6" (ISAF), manufactured by Tokai Carbon Co., Ltd. The temperature of the resultant was raised to 70° C. while a product Robomix manufactured by Primix Corp. was used to disperse the carbon black into the water. Furthermore, thereto was added 0.4 g of dihydrazide isophthalate as a dihydrazide compound to set the ratio by weight of the carbon black/the dihydrazide compound to a ratio by weight shown in Table 3. These components were stirred to prepare a slurry mixture (conditions of the Robomix manufactured by Primix Corp.: a rotation number of 9,000 rpm, a treating period of 30 minutes, and a treating temperature of 70° C.). Next, to the resultant slurry mixture was added a natural rubber latex solution (28% by weight) at 70° C. to give a blend ratio shown in Table 3. Next, a mixer SM-L56, for homeotropic use, manufactured by Sanyo Electric Co., Ltd. was used to mix the existing components with each other (mixer conditions: a rotation number of 11,300 rpm, and a treating period of 30 minutes) to produce a carbon-black-containing aqueous-rubber-latex-solution.

<Step (II): Production of Carbon-Black-Containing Rubber Solidified Product>

Subsequently, while the mixer SM-L56, for home use, manufactured by Sanyo Electric Co., Ltd. was used to blend formic acid (10% solution) as a solidifier to the carbon-black-containing aqueous-rubber-latex-solution (70° C.) produced in the step (I), the solidifier was added to the solution until the pH of the whole of the solution turned into 4. In this way, a carbon-black-containing rubber solidified product was produced (step (II).

<Step (III): Production of Rubber Wet Masterbatch>

A squeezer type uniaxial extruding/dehydrating machine (V-02 type, manufactured by Suehiro EPM Corp.) was used to dehydrate and dry the carbon-black-containing rubber solidified product produced in the step (II) until the water content therein turned to 2.0% or less. In this way, a rubber wet masterbatch was produced (step (III)).

<Step (IV): Production of Rubber Composition and Unvulcanized Rubber Composition>

A Banbury mixer was used to dry-mix the rubber wet masterbatch yielded through the above-mentioned steps with individual materials (other than any sulfur and any vulcanization promoter) shown in Table 3 (kneading period: 3 minutes; composition-discharging-temperature: 150° C.). In this way, a rubber composition was produced. Next, to the resultant rubber composition were added sulfur, a vulcanization promoter (A) and a vulcanization promoter (B) that are shown in Table 3, and then the Banbury mixer was used to dry-mix all the components (kneading period: 1 minute; composition-discharging-temperature: 90° C.). In this way, an unvulcanized rubber composition was produced. The blend proportion of any component in Table 3 is represented by the numerical value (phr) of the part(s) by weight of this component when the whole amount of rubber component contained in the corresponding rubber composition is regarded as 100 parts by weight.

Examples 6 to 8, and Comparative Example 5

A rubber wet masterbatch, a rubber composition and an unvulcanized rubber composition of each of Examples 6 to 8 and Comparative Example 5 were produced in the same way as in Example 5 except that in the item <Step (I): Production of Carbon-Black-Containing Aqueous-Rubber-Latex-Solution> in Example 5, the blend proportion of the used dihydrazide compound was changed into a blend proportion shown in Table 3.

Comparative Examples 3 and 4

In each of the examples, a Banbury mixer was used to dry-mix individual raw materials (i.e., components other than any sulfur and any vulcanization promoter) shown in Table 3 (kneading period: 3 minutes; composition-discharging-temperature: 150° C.). In this way, a rubber composition was produced. Next, to the resultant rubber composition were added sulfur, a vulcanization promoter (A) and a vulcanization promoter (B) that are shown in Table 3, and then the Banbury mixer was used to dry-mix these components (kneading period: 1 minute; composition-discharging-temperature: 90° C.). In this way, an unvulcanized rubber composition was produced.

The unvulcanized rubber composition yielded in each of the working examples and the comparative examples was evaluated as described below. The evaluation results are shown in Table 3.

<Scorch Resistance Evaluation>

About the evaluation of the scorch resistance of each of the examples, in accordance with JIS K6300, a rotor-less Mooney meter manufactured by Toyo Seiki Seisaku-Sho Ltd. was used to pre-heat the unvulcanized rubber composition at 125° C. for 1 minute, and then measure a period t5 required to raise the temperature of the composition, by 5 Mooney units, from the lowest viscosity Vm of the composition. The resultant value was represented by an index relative to the value regarded as 100 in Comparative Example 3. It is demonstrated that as the index of the compositions is larger, the scorch time thereof is longer so that the compositions are better in scorch resistance.

The unvulcanized rubber composition yielded in each of the working examples and the comparative examples was vulcanized at 150° C. for 30 minutes to produce a vulcanized rubber. The resultant vulcanized rubber was evaluated as described below. The evaluation results are shown in Table 3.

<Exothermicity Evaluation>

About the evaluation of the exothermicity of each of the examples, a viscoelasticity tester manufactured by Toyo Seiki Seisaku-Sho Ltd. was used to measure the loss coefficient tan δ under conditions of a static strain of 10%, a dynamic strain of ±2%, a frequency of 50 Hz, and a temperature of 60° C. The value in each of the examples other than Comparative Example 1 was represented by an index relative to the value regarded as 100 in Comparative Example 3. It is demonstrated that as the index of the vulcanized rubbers is smaller, the vulcanized rubbers less easily generate heat so that the vulcanized rubbers are better in low exothermicity.

TABLE 3

| | | Comparative Example 3 | Comparative Example 4 | Comparative Example 5 | Example 5 | Example 6 | Example 7 | Example 8 |
|---|---|---|---|---|---|---|---|---|
| Steps (I) to (III) | Natural rubber latex (solid content therein) | | | 100 | 100 | 100 | 100 | 100 |
| | Carbon black | | | 50 | 50 | 50 | 50 | 50 |
| | Dihydrazide compound | | | | 0.05 | 0.5 | 2 | 5 |
| Step (IV) | Natural rubber | 100 | 100 | | | | | |
| | Carbon black | 50 | 50 | | | | | |
| | Dihydrazide compound | | 0.5 | | | | | |
| | Zinc oxide | 3 | 3 | 3 | 3 | 3 | 3 | 3 |
| | Stearic acid | 2 | 2 | 2 | 2 | 2 | 2 | 2 |
| | Antiaging agent | 1 | 1 | 1 | 1 | 1 | 1 | 1 |
| | Sulfur | 2 | 2 | 2 | 2 | 2 | 2 | 2 |
| | Vulcanization promoter (A) | 1.5 | 1.5 | 1.5 | 1.5 | 1.5 | 1.5 | 1.5 |
| | Vulcanization promoter (B) | 0.5 | 0.5 | 0.5 | 0.5 | 0.5 | 0.5 | 0.5 |
| Evaluations | Exothermicity | 100 | 84 | 90 | 79 | 68 | 67 | 66 |
| | Scorch resistance | 100 | 80 | 100 | 97 | 94 | 89 | 83 |

What is claimed is:

1. A method for producing a surface-treated carbon black, consisting of a step (step (i)) of mixing a carbon-black-containing aqueous-slurry-solution in which a carbon black is dispersed in water with a dihydrazide compound, and subsequently removing the water.

2. The method for producing a surface-treated carbon black according to claim 1, wherein in the step (i), the carbon-black-containing aqueous-slurry-solution is mixed with the dihydrazide compound at 60° C. or higher.

3. The method for producing a surface-treated carbon black according to claim 1, wherein a proportion of the carbon black in the carbon-black-containing aqueous-slurry-solution is from 1 to 20% by weight.

4. A method for producing a rubber composition, comprising a step (step (ii)) of kneading a rubber with a surface-treated carbon black yielded by the method for producing a surface-treated-carbon-black recited in claim 1.

5. The method for producing a rubber composition according to claim 4, wherein an amount of dihydrazide compound is from 0.01 to 10 parts by weight for 100 parts by weight of the rubber component in the rubber composition.

\* \* \* \* \*